United States Patent [19]
Thiel et al.

[11] Patent Number: 5,485,899
[45] Date of Patent: Jan. 23, 1996

[54] FLOATING-FRAME SPOT-TYPE DISC BRAKE FOR HIGH-TORQUE AUTOMOTIVE VEHICLES

[75] Inventors: Rudolf Thiel, Frankfurt am Main; Ulrich Klimt, Gross-Umstadt; Andreas Doell, Frankfurt am Main, all of Germany

[73] Assignee: ITT Automotive Europe GmbH, Frankfurt am Main, Germany

[21] Appl. No.: 269,119

[22] Filed: Jun. 30, 1994

Related U.S. Application Data

[62] Division of Ser. No. 925,708, Aug. 4, 1992, Pat. No. 5,363,944.

[30] Foreign Application Priority Data

Aug. 8, 1991 [DE] Germany ............ 41 26 196.8

[51] Int. Cl.$^6$ ............................................. F16D 55/225
[52] U.S. Cl. .................. 188/73.1; 188/72.4; 188/250 G; 188/370; 188/234
[58] Field of Search .................. 188/73.1, 73.2, 188/250 G, 250 B, 264 G, 218 XL, 72.4, 370, 205 R, 205 A, 73.37, 234–249, 24.22, 24.11, 24.12, 73.38, 217

[56] References Cited

U.S. PATENT DOCUMENTS

| | | | |
|---|---|---|---|
| 2,754,936 | 7/1956 | Butler | 188/370 |
| 2,937,722 | 5/1960 | Ruet | 188/370 X |
| 2,937,723 | 5/1960 | Hodkinson | 188/370 X |
| 3,064,765 | 11/1962 | Dotto | 188/370 X |
| 3,720,293 | 3/1973 | Hikida et al. | 188/73.32 |
| 3,887,044 | 6/1975 | Burgdorf et al. | 188/250 G |
| 3,941,216 | 3/1976 | Burgdorf | 188/250 G |
| 4,076,106 | 2/1978 | Bermingham et al. | 188/250 G |
| 4,276,969 | 7/1981 | Chin et al. | 188/250 G |
| 4,313,527 | 2/1982 | Pickel | 188/73.1 |
| 4,441,592 | 4/1986 | Everett | 188/24.12 |
| 4,572,336 | 2/1986 | Smith et al. | 188/370 |
| 4,596,317 | 6/1986 | Nagai et al. | 188/250 G |
| 4,611,692 | 9/1986 | Everett | 188/250 B |
| 5,033,590 | 7/1991 | Kobayashi et al. | 188/73.1 |
| 5,090,519 | 2/1992 | Golea et al. | 188/370 |
| 5,096,023 | 3/1992 | Thiel et al. | 188/73.1 |
| 5,343,985 | 9/1994 | Thiel et al. | 188/72.5 |
| 5,363,944 | 11/1994 | Thiel et al. | 188/73.31 |

FOREIGN PATENT DOCUMENTS

| | | | |
|---|---|---|---|
| 1217225 | 5/1964 | Germany | 188/72.4 |
| 0266838 | 11/1986 | Japan | 188/73.1 |
| 1151995 | 5/1969 | United Kingdom | 188/250 G |
| 1154233 | 6/1969 | United Kingdom | 188/72.4 |
| 2122277 | 1/1984 | United Kingdom | 188/264 G |

*Primary Examiner*—Douglas C. Butler
*Attorney, Agent, or Firm*—Robert P. Seitter; J. Gordon Lewis

[57] ABSTRACT

A floating-frame spot-type disc brake is described comprising a floating frame (1) guided in a manner axially displaceable on a brake carrier (12), and being furnished with two brake cylinders (2, 3) and two brake pistons (4, 5) directly acting on two axially inwardly disposed brake shoes (6, 7). The brake carrier (12) is located entirely on one side of the brake disc and no portion extends across the outer edge of the brake disc (15), so that the maximum diameter of the brake disc is limited only by the relatively thin sections of the floating frame (1) extending across the outer edge of the brake disc. Additional brake shoes (8, 9, 22), on the axially outer side, are fixed to the floating frame (1), in turn transmitting the circumferential force acting on the outer shoes occurring during braking, through a bolt guide (10), into the brake carrier (12).

4 Claims, 4 Drawing Sheets

FLOATING-FRAME SPOT-TYPE DISC BRAKE FOR HIGH-TORQUE AUTOMOTIVE VEHICLES

This application is a division of application Ser. No. 07/925,708 filed Aug. 4, 1992, now U.S. Pat. No. 5,363,944.

BACKGROUND OF THE INVENTION

The present invention is concerned with a floating-frame spot-type disc brake for high-torque automotive vehicles designed for high performance.

Automotive vehicles designed for high driving speeds require increasingly efficient brakes. High-torque brakes, among other things, require large brake disc diameters. Conversely, the diameters of the vehicle wheels is set by other factors not allowing an increase in wheel diameter. These two requirements severely restrict the assembly space available for the brake between the outer brake disc edge and the wheel rim. Normally the brake caliper of a disc brake encloses the outer edge of the brake disc, with the radial dimensions of a bridge of the brake caliper located in the aforementioned assembly space limiting the maximum brake disc diameter. The caliper bridge, conversely, is required to have substantial strength as it transmits the tensile forces required for braking.

In a prior-art solution of the type as described in DE-OS 35 08 039, the brake disc has been replaced by an annular disc, the radial inner edge of which is enclosed by the brake caliper (internally enclosing disc brake). The radially outer edge of the annular disc substantially extends to the wheel rim, with the maximum possible diameter being attained. However, this high-torque brake is disadvantageous in that the manufacture and assembly of the annular disc on the vehicle wheel involves substantial effort and costs.

EP-412 541 shows a disc brake suitable for a high performance brake, with the brake caliper thereof being in the form of a floating frame which is axially guided on a brake carrier integrally connected to the steering knuckle of the automotive vehicle. The brake carrier extends beyond the outer edge of the brake disc. The floating frame encloses four brake shoes disposed on either side of the brake disc and transmits the tensile force. The circumferential forces are transferred from the brake shoes to the brake carrier. The brake carrier, on the axial inner side of the wheel, is connected to the automotive vehicle. In order to enable the circumferential forces of the two axial outer brake shoes to also be absorbed, the brake carrier comprises a carrier arm extending across the outer edge of the brake disc and through the center of the chamber enclosed by the floating frame.

High torque brakes require that the brake shoes have large friction surfaces. Increasing the size of the brake shoes, especially in the circumferential direction of the brake disc, has the disadvantage that the friction surface is no longer has a uniform pressure applied, even if two brake cylinders in side-by-side relationship are used instead of one brake cylinder. Consequently, two short-length brake shoes are used, which are separately pressed onto the brake disc by each of two brake pistons in side-by-side relationship.

An additional requirement placed upon a high performance brake is that its weight should be as low as possible. For increasing the weight of high-torque brakes increases the unsprung weight on the vehicle wheels, which, in turn, has a negative effect on the handling of the automotive vehicle. For this reason, the braking efficiency cannot be enhanced by simply increasing the size of the brake.

It is an object of the invention to improve the brake performance of a disc brake of the afore-described type, while maintaining a low weight.

SUMMARY OF THE INVENTION

The present invention is constituted by an arrangement for mounting brake shoes to a brake carrier located entirely on the inside of the brake disc and mounting the two inside brake shoes. A floating frame is mounted to the brake carrier, surrounding both brake shoe sets, and the floating frame is constituted in part by spaced arm sections which extend across the brake disc edge, to an outer portion, the outer portion receiving the outside brake shoes.

This brake design has the advantage that the maximum diameter of the brake disc is limited only by the thickness of the floating frame. The sections of the floating frame extending across the edge of the brake disc can be thin as, primarily, they have to transmit tensile forces and substantially no bending torques. Another advantage resides in the weight savings due to the eliminated carrier arm.

The opening enclosed by the floating frame defines the width of the friction surface of the brake shoes, as the space accommodating the brake shoes is not restricted by the presence of a carrier arm. The brake shoes can thus be more closely fit to the available space. Consequently, with identical dimensions of the floating frame, a larger friction surface is attained, or, with a constant friction surface, the size and, hence, the weight of the brake is reduced.

In conventional floating-frame disc-type brakes, the brake shoes are usually fixed to retaining pins that extend within the area between the wheel rim and the radially outer edge of the brake disc, in the axial direction. However, the maximum permitted brake disc diameter might thereby be restricted.

According to the present invention, mounting means are provided on the rear side of the brake shoes and within the interior of the brake. The improved fixation does not restrict the brake disc diameter and enables a particularly simple and safe manual assembly of the brake shoes. For this purpose, a brake shoe is introduced from the exterior through the opening enclosed by the floating frame and carrying a pin radially forced against the edge of a groove on a hollow actuator piston by a retaining spring, whereby the brake is locked on the floating frame.

The retaining spring for use with a disc brake of the invention is formed with clips engaging the brake carrier and a tongue urging an associated brake shoe radially outward.

DETAILED DESCRIPTION

Figure 1:
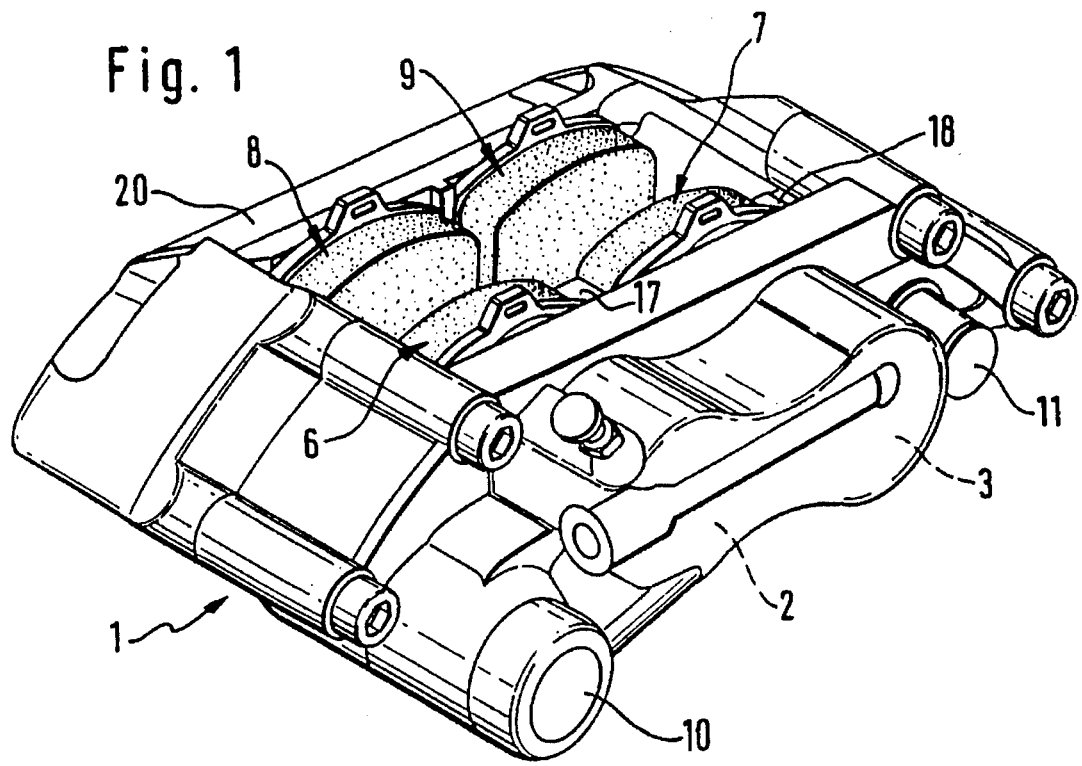
FIG. 1 is a perspective full view of a first embodiment of a floating-frame-type brake using the brake shoe mounting according to the invention.

A first embodiment of a floating-frame-type brake is shown in FIGS. 1 to 4. A floating frame 1 is provided which is generally rectangular, and having a pair of arm sections extending across the outer edge of the brake disc 15, and an inner and outer connected sides defining a central opening. The central opening encloses pairs of brake shoes 6, 7, 8, 9 on either side of the brake disc 15. A hydraulic actuator is provided on the inner side of the floating frame 1, comprising two brake cylinders 2, 3 in side-by-side relationship and two brake pistons 4, 5 sliding within the brake cylinders 4, 5. The brake pistons 4, 5, upon actuation of the hydraulic actuator, force the inside two brake shoes 6, 7 directly against the brake disc 15 (shown in dashed lines), while the two outside brake shoes 8, 9 are anchored on the outer side of the floating frame 1 and, through the same, are indirectly forced against the disc brake 15.

The floating frame 1, through two bolt guides 10, 11, is disposed on a brake carrier 12 in an axially displaceable manner. For rigidly anchoring the brake carrier 12 on the steering knuckle (not shown) of the automotive vehicle, two bores 13, 14 are provided for receiving two mounting screws therethrough.

Figure 2:
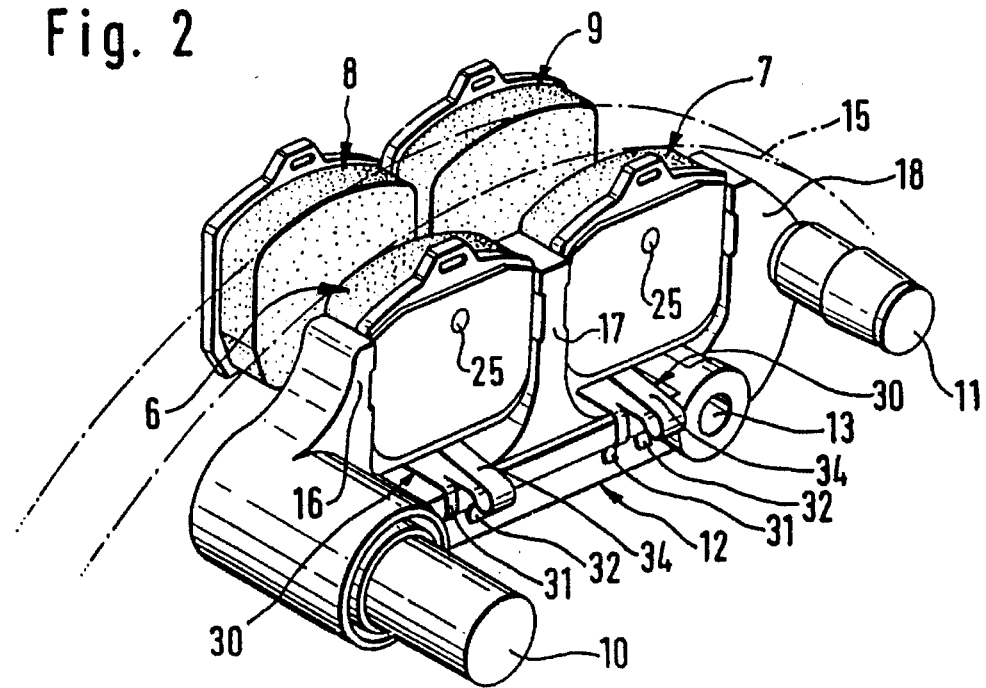
FIG. 2 is a perspective partial view of the brake carrier with brake shoes according to FIG. 1, with the floating frame removed.

As best shown in FIG. 2, the brake carrier 12 is completely disposed on the inner axial side of the brake disc 15, and comprises three radial fingers 16, 17, 18 between which the brake shoes 6, 7 are axially displaceable. Through the fingers 16, 17, 18, the circumferential forces occurring during braking are transmitted from the axially internally disposed brake shoes 6, 7 to the brake carrier 12 directly. By dividing the total friction surface among two small brake shoes 6, 7 and by the independent actuation thereof through two brake pistons 4, 5, a uniform contact pressure and an improved noise generation characteristic are attained.

The two axially outer brake shoes 8, 9 are connected to the outside floating frame 1, thereby enabling the circumferential forces arising during brake operation to be transmitted, through the arm sections of the floating frame 1 and through the bolt guide 10, into the brake carrier 12.

The bolt guide 10 for transmitting the circumferential forces is of a particularly strong design. The other bolt guide 1 is weaker, as it only serves for guiding the floating frame 1. To compensate manufacturing tolerances, the bolt guide 11, moreover, is provided with a self aligning bearing.

In view of this arrangement in which the circumferential forces of the axially outer brake shoes 8, 9, through the floating frame 1, are transferred to the axially internal brake carrier 12, the latter may be of a very compact and lightweight design. No brake carrier arm is provided extending across the outer edge of the brake disc 15.

Figure 4:
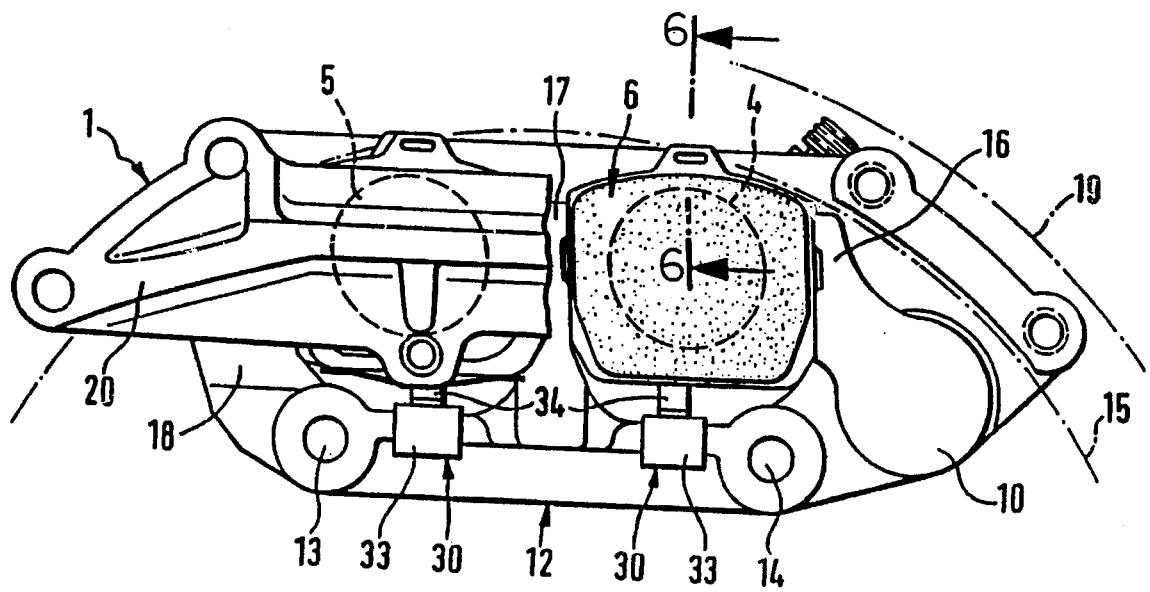
FIG. 4 is a side view, partly in section, of the brake of FIG. 1 viewed from direction A in FIG. 3.

As best shown in FIG. 4, the floating frame 1, has arm sections passing through the area between the outer edge of the brake disc 15 and the wheel rim shown in broken lines 19 which are of an extremely thin configuration, thereby limiting the maximum brake disc diameter as little as possible.

Figure 3:
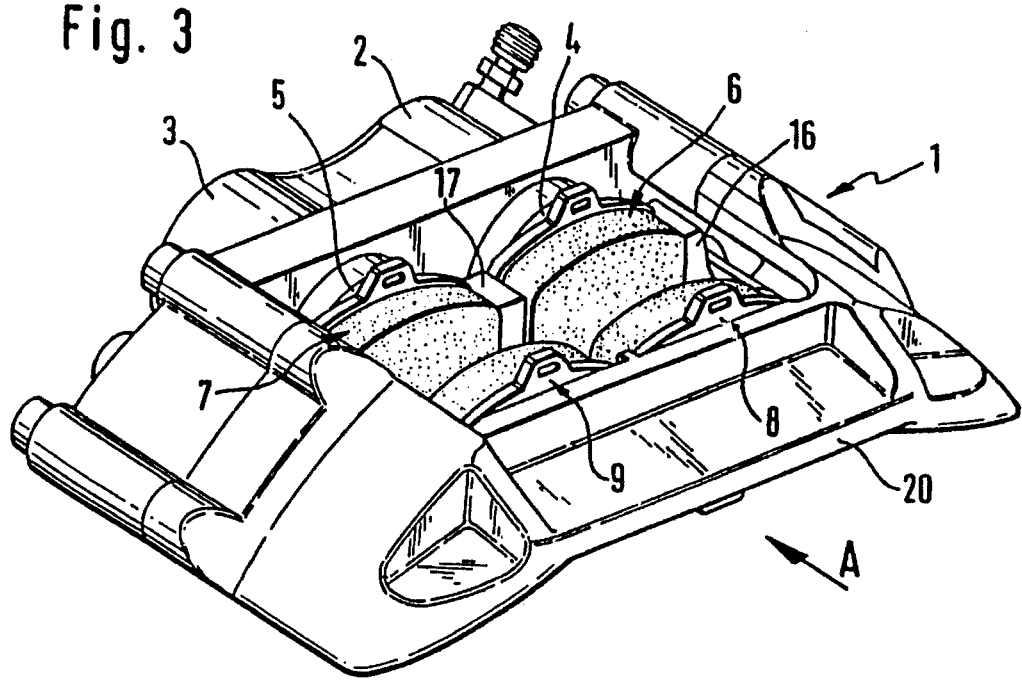
FIG. 3 is a perspective view of the brake according to FIG. 1, shown in the reverse direction.

As best shown in FIG. 3, the floating frame 1, on the axially outer side thereof connecting the arm sections, is reinforced by a web 20 which, on the sides thereof, is angled to substantially follow the brake disc edge.

Figure 5:
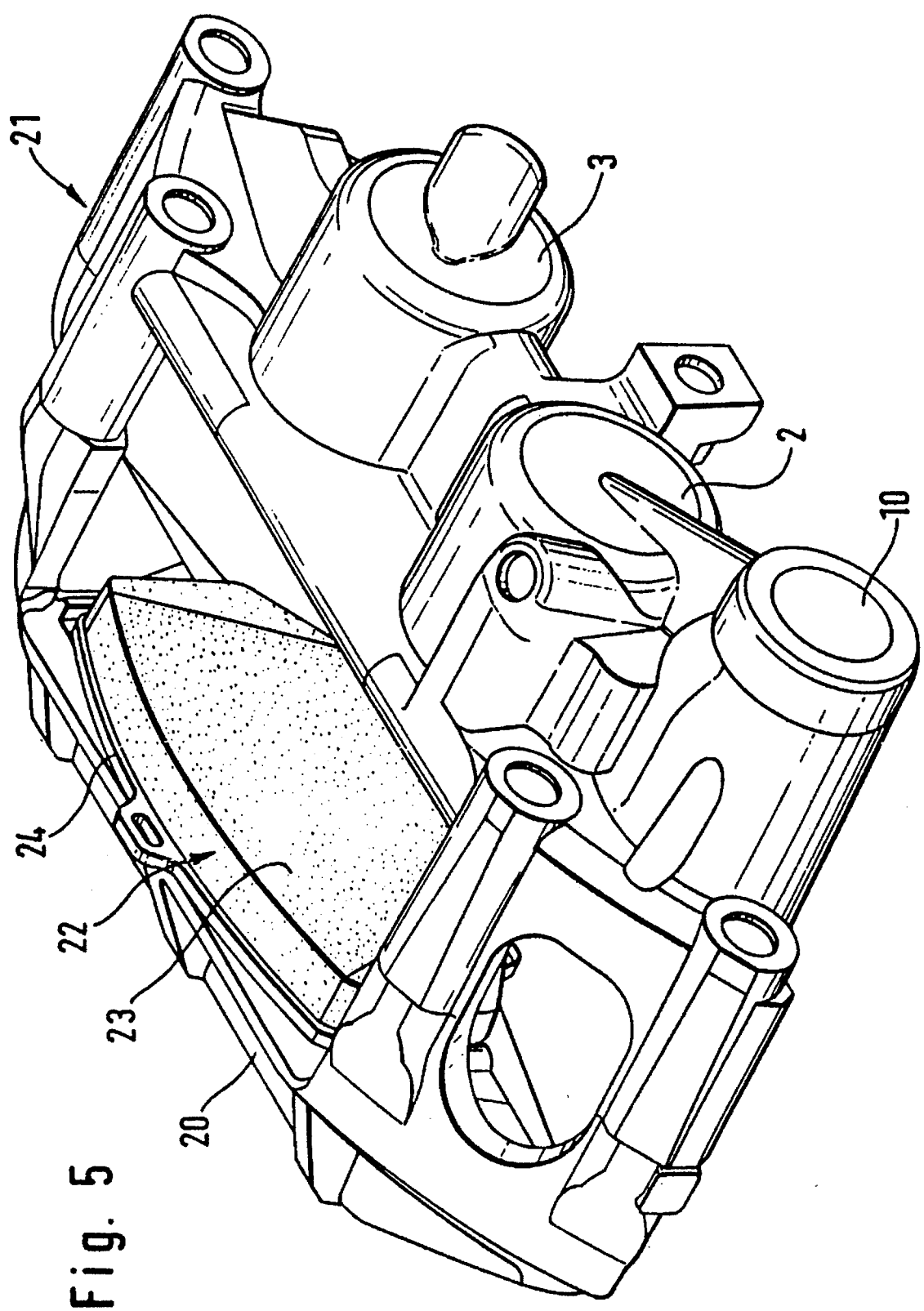
FIG. 5 is a perspective full view of a second embodiment of a floating frame brake.

FIG. 5 shows a second embodiment of a floating caliper brake 21 using the brake shoe mounting according to the invention, in which only a single brake shoe 22 is provided on the axially outer side. The area of the friction surface 23 of the brake shoe 22 substantially equals the aggregate areas of the friction surfaces of the opposite inside brake shoes 6, 7 (not shown in FIG. 5). A division of the friction surface 23 among two smaller brake shoes, on the axial outer side of the floating frame 1, is not so urgently needed as it is on the opposite inner axial side since the brake shoe 22 is connected to the outer side of the floating frame 1 and is thereby in planar abutment with a large internal face defined by the outside section, thereby insuring a uniform contact pressure of the large friction face 23 against the brake disc 15.

Figure 6:
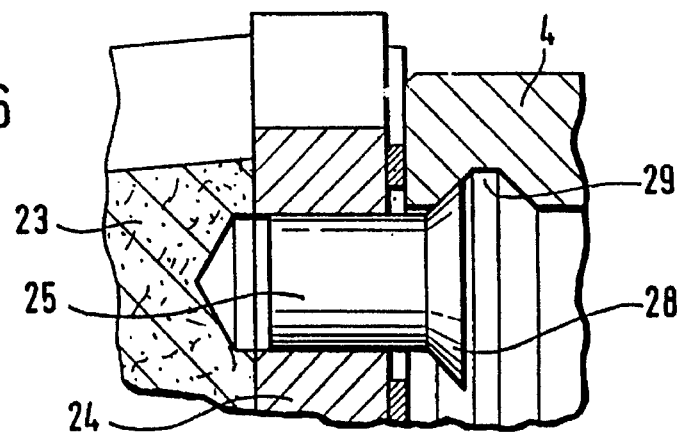
FIG. 6 is a sectional view of a detail of a brake shoe along line 6—6 of FIG. 4 with a pin forced into a bore in the brake shoe back plate, the pin used to mount the brake shoe to the brake piston according to the concept of the invention.
Figure 7:
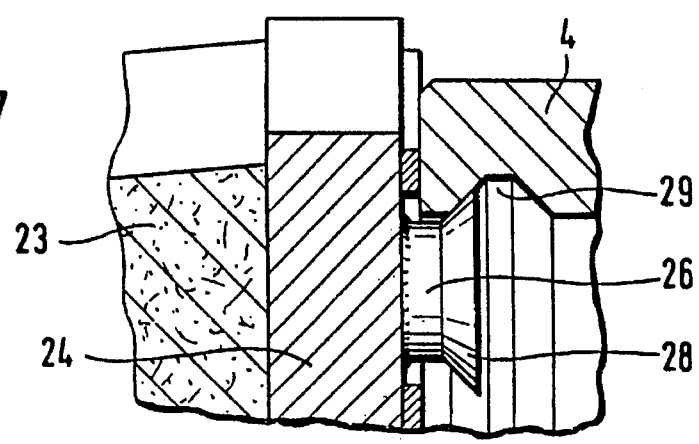
FIG. 7 is a sectional view detail of the brake shoe according to the invention but with the pin welded to the brake shoe back plate.
Figure 8:
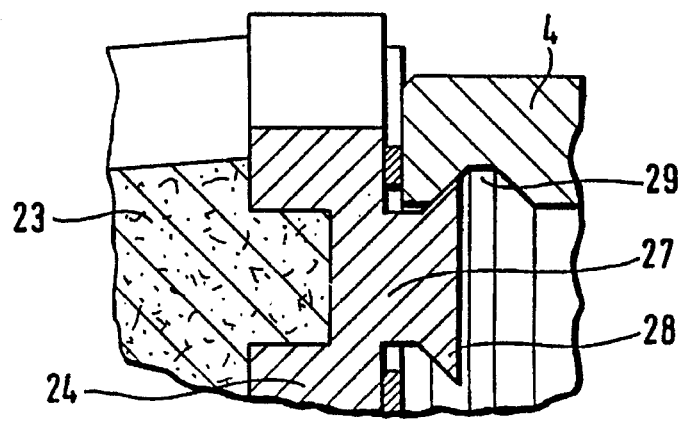
FIG. 8 is a sectional view detail of a form of the brake shoe in which the pin is formed by a punched-through projection of the back plate.

As best shown in FIGS. 6 to 8, each of the brake shoes 23 is furnished with a pin 25 secured to the back plate 24 thereof, with the free end 28 of pin 25 being conically broadened. The pin 25 is forced into a bore within the back plate 24.

Alternatively, as shown in FIG. 7, a modified pin 26 also can be welded, as by friction welding, to the back plate 24.

In one embodiment shown in FIG. 8, the separate pin and the mounting thereof can be foregone. In that instance, the back plate 24 is provided with a punched-through projection 27 forming the pin, the protruding end 28 of which is frusto-conically shaped.

The brake pistons 4, 5 are hollow and open ended. On the inside of each piston is provided a circumferential annular groove 29. The pin 25 of a respective brake shoe 6, 7 in engagement with the open end of a brake piston 4, 5, has one side of frusto-conical end 28 thereof received into the annular groove 29 at one point along the circumference of the annular groove 29 lying at the top of the piston 4, 5.

The brake shoes 6, 7 by means of two retaining springs 30 (FIGS. 2, 4) attached to the brake carrier 12 are forced radially outwardly (upwardly in the drawings), so that the pins 25 securely engage the annular grooves 29, thereby radially fixing the brake shoes 6, 7. One side of the undersurface of each of the conical ends 28 interengages with one side of the annular groove of the respective piston 4 or 5, axially forcing the shoe 6 or 7 against the brake pistons 4 or 5 as the end 29 is moved into the groove 29. The location of each pin 25 at the top of each back plate results in approximate centering of the brake shoe 6, 7 on the piston 4 or 5.

The angled retaining springs 30 integrally punched from a sheet of spring metal respectively comprise three anchor clips 31, 32, 33 and one spring tongue 34. The anchor clips 31, 32, 33 enclose the two axial sides of a web of the brake carrier 12 to be locked therein (FIGS. 2, 4). The spring tongue 34 is in abutment with the radially inward narrow side of the back plate 24 of the brake shoe 6, 7. As the spring tongue 34 is slightly bent vis-a-vis the axial direction, it will urge the brake shoe 6, 7 not only radially outwardly (upwardly) but also axially against the brake piston 4, 5.

The back plate 24 of each of the brake shoes 6, 7, 8, 9, 22, at the radially outer narrow sides thereof, are provided with an ear. The ears are not intended for the passage of pins therethrough but for insuring an easy removal of the brake shoes.

We claim:

1. A brake shoe mounting for a spot type disc brake having a frame, said frame having a brake cylinder including a brake piston having an open end;

a brake shoe comprising a friction pad and a back plate, said back plate having a front surface having said friction pad attached thereto, said back plate also having a rear surface and a pin projecting from said back plate rear surface, said pin having a broadened end spaced from said rear surface of said back plate; said piston having an annular groove formed within said open end, one side of said pin broadened end received within said annular groove of said piston at one point only along the circumference of said annular groove and spring means for urging and holding the pin end within said annular groove of said piston.

2. The brake shoe mounting according to claim 1 wherein said spring means for urging and holding comprises a retainer spring mounted to said frame and having a portion engaging said brake shoe back plate and urging said back plate radially outward to hold said one side of said pin end within said annular groove within said piston.

3. The brake shoe mounting according to claim 2 wherein said retainer spring portion comprises an inclined spring tongue causing said brake shoe to also be urged axially towards said piston.

4. The brake shoe mounting according to claim 1 wherein said broadened end of said pin is of an inverted frusto-conical shape with a sloping perimeter, and wherein said annular groove has a sloping side engaged with said one side of said pin end sloping perimeter to draw said back plate towards said open end of said piston as said one side of said broadened end is moved radially into said groove.

* * * * *